May 12, 1964

T. C. HOWARD ETAL 3,132,444

LOAD-BEARING STRUCTURE

Filed April 28, 1960

INVENTOR.
THOMAS C. HOWARD
DUNCAN R. STUART

BY

ATTORNEYS

May 12, 1964 T. C. HOWARD ETAL 3,132,444
LOAD-BEARING STRUCTURE
Filed April 28, 1960 6 Sheets-Sheet 2
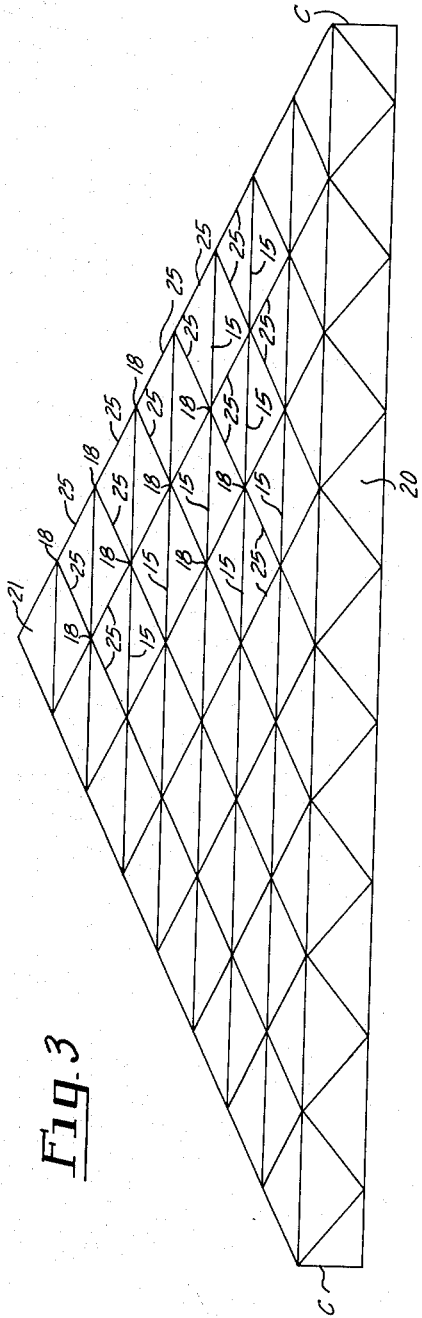
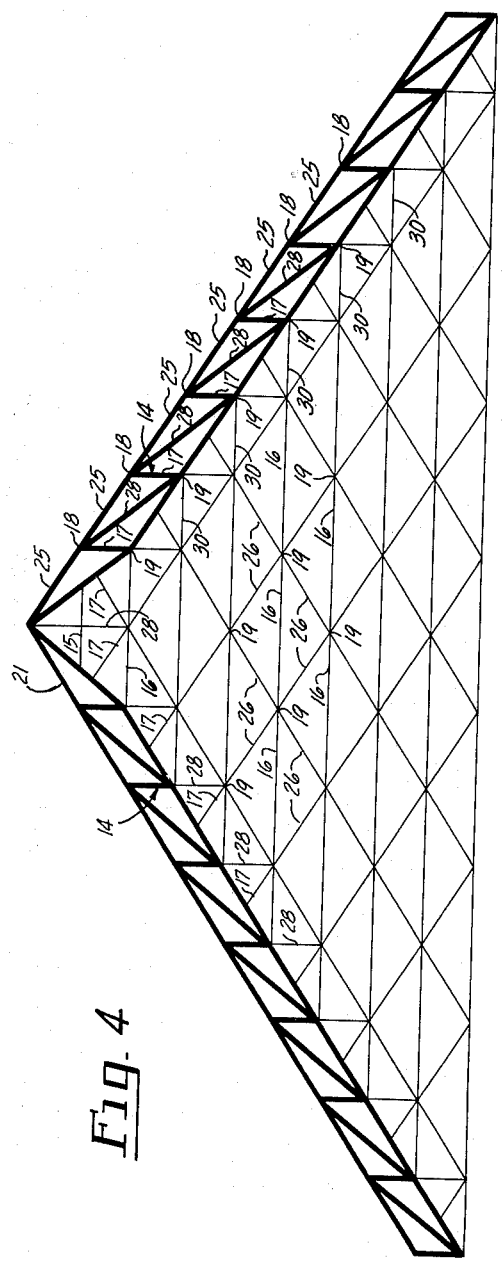
Fig. 3
Fig. 4
INVENTOR.
THOMAS C. HOWARD
DUNCAN R. STUART
BY
ATTORNEYS May 12, 1964  T. C. HOWARD ETAL  3,132,444
LOAD-BEARING STRUCTURE
Filed April 28, 1960  6 Sheets-Sheet 4

INVENTOR.
THOMAS C. HOWARD
DUNCAN R. STUART
BY
ATTORNEYS

May 12, 1964 T. C. HOWARD ETAL 3,132,444
LOAD-BEARING STRUCTURE
Filed April 28, 1960 6 Sheets-Sheet 5

INVENTOR.
THOMAS C. HOWARD
DUNCAN R. STUART
BY
ATTORNEYS

INVENTOR.
THOMAS C. HOWARD
DUNCAN R. STUART
ATTORNEYS

United States Patent Office 3,132,444
Patented May 12, 1964

3,132,444
LOAD-BEARING STRUCTURE
Thomas C. Howard and Duncan R. Stuart, Raleigh, N.C., assignors to The Gillmore-Olson Company, Cleveland, Ohio, a corporation of Ohio
Filed Apr. 28, 1960, Ser. No. 25,423
11 Claims. (Cl. 50—55)

This invention relates to architectural structures and particularly to load-bearing structures having substantial areal dimensions and being modularly adapted to provide unified structures of much greater areal dimensions and capable of being used, for example, to roof large areas when supported solely at points near their edge.

Structures comprehended by our invention find utility, for example, as roofs for buildings of large open-floor plan area in which it is desirable and/or necessary that no columns or roof supporting structures intrude upon the area covered. Such buildings are particularly suited for use as warehouses and are also desirable, for example, for housing supermarkets, bowling alleys and certain manufacturing operations.

A principal object of our invention, therefore, is to provide an integrated load-bearing structure having substantial areal dimensions. A further object is to provide such a structure that is modularly adapted so that a plurality of such structures may be combined to provide a unified structure of areal dimensions substantially equal to the sum of the areal dimensions of all of the plurality of modular structures. Another object is to provide an integrated load-bearing structure adapted to roof an area substantially equal to its areal dimensions when supported only at suitable points near its edges. An additional object is to provide a unified structure comprised of a plurality of integrated load-bearing structures and each having an even number of sides all of equal length whereby a number of such unified structures may be multiplied or modularly expanded laterally in any and all directions by locating any side of one of such structures directly adjacent any side of any other of like structures. A specific object of our invention is to provide a unified pyramidal structure comprised of four integrated isosceles triangular load-bearing structures arranged so that the base sides of the triangular sections all lie in the same plane and define the base of the unified structure and so that the apexes opposite the base sides of the triangular structures meet at a common point vertically spaced from the plane containing the base of the unified structure and together form a pyramidal apex and so that the contiguous side legs of adjacent triangular structures form an inclined ridge extending from the pyramidal apex to one of the corners of the base of the unified structure. It is yet another object of our invention to provide an integrated load-bearing structure adapted to be easily constructed in the field of strut-like members of relatively much shorter length compared to the greater linear dimensions of the completed structure. A further object is to provide an integrated load-bearing structure having greater strength and load-bearing capacity per unit of weight of the structure than similar structures heretofore known.

Broadly, our invention comprehends an integrated load-bearing structure of generally isosceles triangular form and the manner of structurally relating, combining and connecting such structures to each other to form a unified load-bearing and generally pyramidal structure. The triangular structures are comprised of a plurality of trusses of decreasing length arranged parallel to each other with the longest at the base side of the triangular structure and the others laterally spaced apart and arranged in order of decreasing length between the base side and the opposite apex. In addition, strut-like members interconnect the trusses and constrain them in this arrangement and contribute to the integrity and integrality of the structure. The triangular structures are particularly adapted to provide maximum load-bearing strength and rigidity when the structure is inclined from the horizontal with the base side extending longitudinally in a horizontal direction and the apex opposite the base side vertically spaced therefrom and when the trusses comprising the triangular structure extend vertically in depth. Pyramidal structures comprised of such triangular structures are capable of being supported on columns located only at points near the edges of their bases. For example, pyramidal structures embodying this invention and having base sides 100 feet in length are capable of providing a roof over an area of 10,000 square feet when supported only at the four corners.

A more detailed understanding of our invention will become apparent from the following description and the accompanying drawings illustrating preferred forms thereof in which:

FIG. 3 is a side elevation view of the structure shown in FIGURE 2;

FIGURE 4 is a sectional elevation view of the structure of FIGURE 2 taken in a vertical plane containing section line 4—4;

Figure 1:
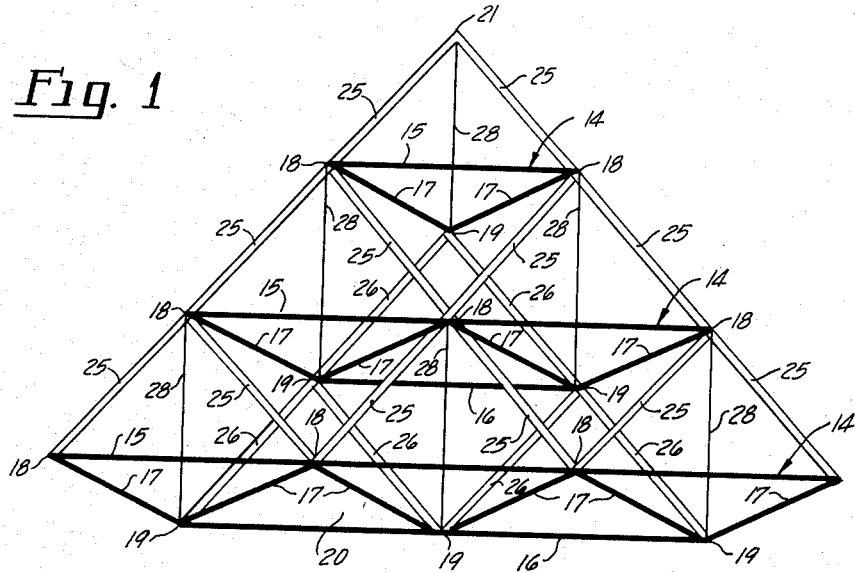
FIGURE 1 is a view normal to the plan surface of a triangular structure constructed according to the teachings of this invention and showing in depth the arrangement of the elements comprising the trusses and their interconnecting members.

Referring now to the drawings, FIGURE 1 illustrates a typical triangular shaped structure constructed in accordance with the teachings of this invention. The general form of the structure is that of a thickened panel of triangular form having upper and lower parallel surface planes, a base and two side surface planes inclined with respect to the upper and lower surface planes at acute and obtuse angles, respectively, and extending between and joining the upper and lower planes.

Three simple trusses, shown in heavy solid lines and indicated generally at 14, comprise the structure of FIGURE 1. The trusses 14 consist of upper chord members 15, lower chord members 16 and web members 17. The upper and lower chord members 15 and 16, of each truss are parallel and lie in the upper and lower surface planes, respectively. Web members 17 zig-zag back and forth between and interconnect the chord members. For convenience, the points of interconnection between web members 17 and upper chord members 15 in the upper surface plane will be referred to as upper panel points 18 and the points of interconnection between web members 17 and lower chord members 16 in the lower surface plane will be referred to as lower panel points 19.

The trusses 14 are arranged so as to lie in laterally spaced apart parallel planes which, as shown in FIGURE 1, are inclined from the vertical. One of the trusses 14 constitutes the base 20 of the triangular structure. Proceeding from the truss 14 at base 20 toward apex 21 of the triangular structure, the trusses become successively shorter so that the ends of the upper chord members of the trusses 14 and upper chord 15 of the base 20 define a triangle in the upper surface plane and the ends of the lower chord members 16 together with lower chord member 16 of the base 20 define a triangle in the lower surface plane similar to but smaller than the triangle defined in the upper surface plane. Upper and lower panel points 18 and 19, respectively, are aligned in rows and define a triangular grid pattern in their respective planes. Further, they are arranged so that upper panel points 18 of one truss are laterally opposite lower panel points 19 of the next adjacent truss and vice versa.

Trusses 14 are laterally braced with a lateral system of bracing lying in the upper surface plane and a lateral system of bracing lying in the lower surface plane and comprising elements 25 and 26, respectively, and represented in FIGURE 1 by closely spaced parallel solid lines. Bracing elements 25 and 26 are arranged to interconnect the panel points lying in their respective surface planes so that with the chord members lying in their associated plane they form a grid of isosceles triangles similar to the triangular plan form of the whole triangular structure.

In addition to a system of lateral bracing in each of the surface planes, trusses 14 are laterally interconnected by cross-braces 28 illustrated in FIGURE 1 by light solid lines. Cross-braces 28 extend between lower panel points 19 of trusses 14 and laterally opposite upper panel points 18 of trusses 14 next adjacent in the direction of apex 21 of the triangular structure.

It will be understood that the triangular structure of this invention is not limited to the triangular section shown in FIGURE 1 and described above as being composed of three trusses and their associated upper and lower systems of lateral bracing and their cross-braces, but may be expanded and enlarged to form triangular structures of greater area by the addition of trusses of successively increasing length to the base side and additional upper and lower lateral bracing and cross-braces according to the systems and arrangement described in connection with and illustrated in FIGURE 1.

In the foregoing description of the triangular structure shown in FIGURE 1, the adjectives "upper" and "lower" have been applied to the parallel triangular surface planes, the chord members and the panel points of trusses as they appear in the figure purely for convenience in and clarity of expression and not for definition within the teachings of this invention. It will be understood that this invention comprehends triangular structures like that shown in FIGURE 1 except that elements therein designated "lower" are vertically higher than those elements designated "higher."

The depth of the trusses and the size and cross-sectional shape of the various truss and bracing elements is related to the overall size of the triangular sections to be constructed, the tensile and compressive strength of the materials employed and the magnitude and nature of the loads to be carried by the structure. The structure of this invention may be designed to carry a substantially greater load per unit of weight of the structure than other known structures. One of the primary advantages of this invention, therefore, is the great strength and load-bearing ability of the structure compared to the weight of the structure itself.

Figure 2:
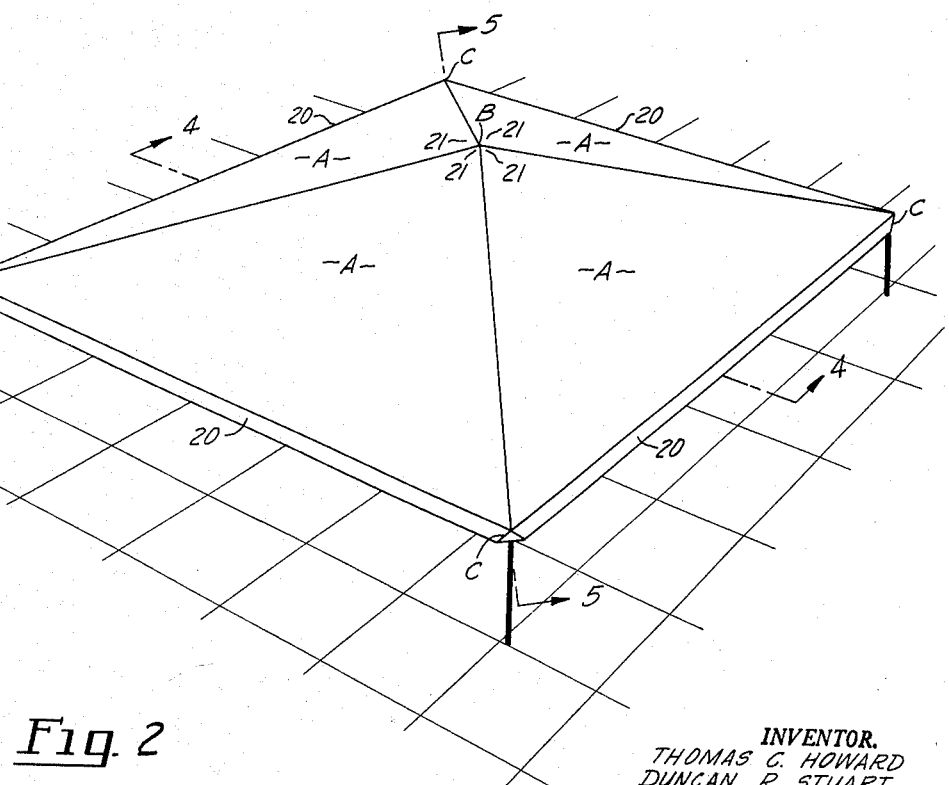
FIGURE 2 is a perspective view showing the general form of a square pyramidal roof structure made up of four triangular structures constructed, arranged and interconnected in accordance with this invention.

Triangular structures such as described above and shown in FIGURE 1 are particularly adapted, for example, to form a unified pyramidal roof structure supported near its four base corners as shown in perspective in FIGURE 2 and in elevation in FIGURE 3. In FIGURE 2, the structure is represented in terms of surface planes and, in FIGURE 3, only those members that lie in the exterior surface plane and along its base 20 are shown. The pyramidal roof, as seen in FIGURE 2, is comprised of four thickened panels or triangular structures such as the one described in connection with and as shown in FIGURE 1. The four triangular structures, designated "A," are oriented so that their bases 20 together form a square lying in a horizontal plane. Their apexes 21 meet at a common point or pyramidal apex B that is vertically spaced from the horizontal plane containing the base face of the pyramidal structure. Adjacent side legs of adjacent triangular sections have a common line of contact along inclined ridges R in the roof extending from the pyramidal apex B to the base corners C.

In FIGURE 4, a cross section through the pyramidal structure shown in FIGURE 2, two triangular structures sectioned along their altitudes are shown by heavy solid lines and a third triangular structure comprising one-quarter of the pyramidal roof is illustrated by showing with light solid lines only those structural members contained in the interior surface plane thereof. As seen most clearly in sectional view, FIGURE 4, all of the trusses 14 making up the thickened panels or triangular structures A longitudinally extend in a horizontal direction within parallel, vertical planes and the exterior and interior surface planes of the panels A are parallel and inclined from the horizontal.

Figure 5:
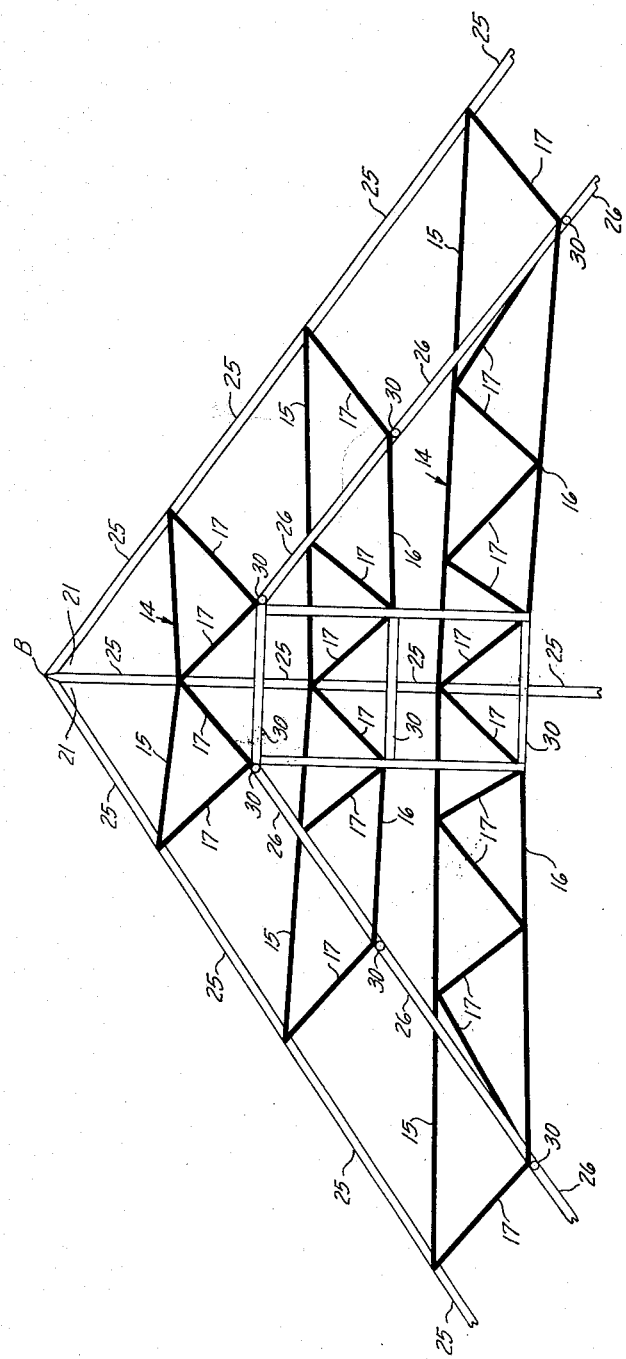
FIGURE 5 is a partial sectional perspective view of the structure of FIGURE 2 taken in a vertical plane containing section line 5—5.

FIGURE 5 illustrates in detail the preferred manner of joining triangular sections such as those described above to form a unified pyramidal roof as shown in FIGURE 2. As noted above, such structures are comprised of similar triangular surface planes, but the triangle of one of the surface planes is greater in area than that of the other surface plane. It will be noted in FIGURE 1 that upper chord members 15 of all of the trusses 14 are spaced vertically above and are longer than their associated lower chord members 16 and thus the side edges of the triangular upper surface plane lie laterally outwardly of the side edges of the triangular lower surface plane. The extent of the lateral spacing between corresponding edges of the triangular upper and lower surface planes is such that when the triangular sections are arranged as shown in FIGURE 2 and associated FIGURES 3, 4 and 5, upper surface plane triangles of adjacent triangular sections meet along an inclined ridge and lower surface plane triangles of adjacent triangular sections are laterally spaced apart. The bases 20 of adjacent triangular sections are disposed at right angles to each other to form base corners of the unified structure and the apexes 21 are in mutual contact at the pyramidal apex B. Elements in adjacent upper or larger surface planes are joined together in any suitable manner along the inclined ridge of the roof. A common ridge member of suitable strength to serve both adjacent and connected triangular sections may be employed to extend from the corner formed by the two bases 20 to the apex B formed by the two apexes 21. The lower triangular surface planes of adjacent triangles are connected by struts 30 extending between laterally opposite panel points 19 at the spaced apart ends of chords 16. The connecting braces 30 will thus extend horizontally and traverse a vertical plane containing the inclined ridge.

Additional triangular sections may be connected together in like manner so that four comprise a unified pyramidal roof structure as shown in FIGURE 2. When four triangular structures are thus put together, they comprise a unified pyramidal roof having a plurality of concentric truss polygons of decreasing size horizontally disposed at different elevations with respect to the base of the pyramidal roof and with the lowermost polygon being the largest. Each side of each of the truss polygons is formed of a truss 14 of a triangular structure making up the pyramidal roof. The outer ends of upper chord members 15 of the trusses 14 comprising each truss polygon are joined together and the outer ends of lower chord members 16 are laterally spaced apart and connected by struts 30 lying in the horizontal plane of the lower chord members 16 and cutting across the corner formed by the intersection of the two trusses 14. The corners of the concentric truss polygons in the upper surface plane are all aligned between the pyramidal apex B and a corner of the base C in a vertical plane containing the inclined ridge. The truss polygons are held in this relationship by the lateral systems of bracing in the two surface planes and by the cross-braces of each of the sections making up the pyramidal roof.

It is to be understood that any suitable material may be employed as a roof covering, preferably by fastening it in a suitable manner to the members lying in the upper surface plane.

As seen in FIGURE 2, unified pyramidal roofs having four faces intersecting at a pyramidal apex B are comprised of four similar isosceles triangular sections. Pyramidal roof structures having any number of faces intersecting at a pyramidal apex may be formed of such a number of similar isosceles triangular sections constructed in accordance with this invention and joined together in the manner described herein in connection with FIGURE 2.

Various combinations of roof structures may be formed of the four-sided pyramidal roof structure shown in FIGURE 2 or of pyramidal roof structures constructed in accordance with this invention and having three or more pyramidal faces. Structures of any number of faces may be built adjacent each other in a series arrangement by erecting adjacent structures so that their equal length sides are continuous. See, for example, FIGURE 6. Depending upon the configuration of the base of any particular polygonal pyramidal structure, the structures may be arranged in a series-parallel arrangement or a grid pattern. For instance, four square base pyramidal structures may be combined in a series arrangement to provide a roof covering a rectangular area whose length is four times the length of one side of one of the pyramidal structures and whose width equals the length of one side of one of the pyramidal structures. As illustrated in solid and dotted lines in FIGURE 6, the same four square base pyramidal structures may be arranged to form a roof covering a square area four times that covered by one of the square base pyramidal structures. Also, for example, pyramidal structures constructed according to this invention of six triangular sections and having hexagonal bases may be similarly joined together by erecting the structures so that equal length sides of adjacent structures are adjacent.

Figure 6:
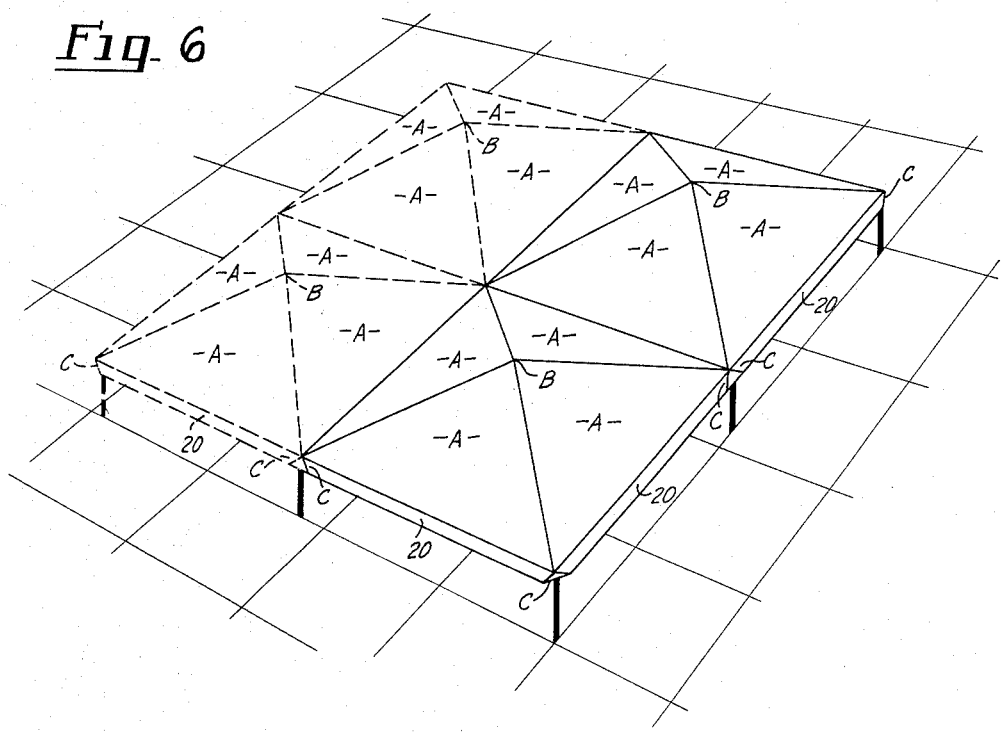
FIGURE 6 is a perspective view showing in solid lines a rectangular structure comprised of two square unified structures such as shown in FIGURE 2, and, in broken lines, two other square unified structures all of which together form a large square roof structure.
Figure 7:
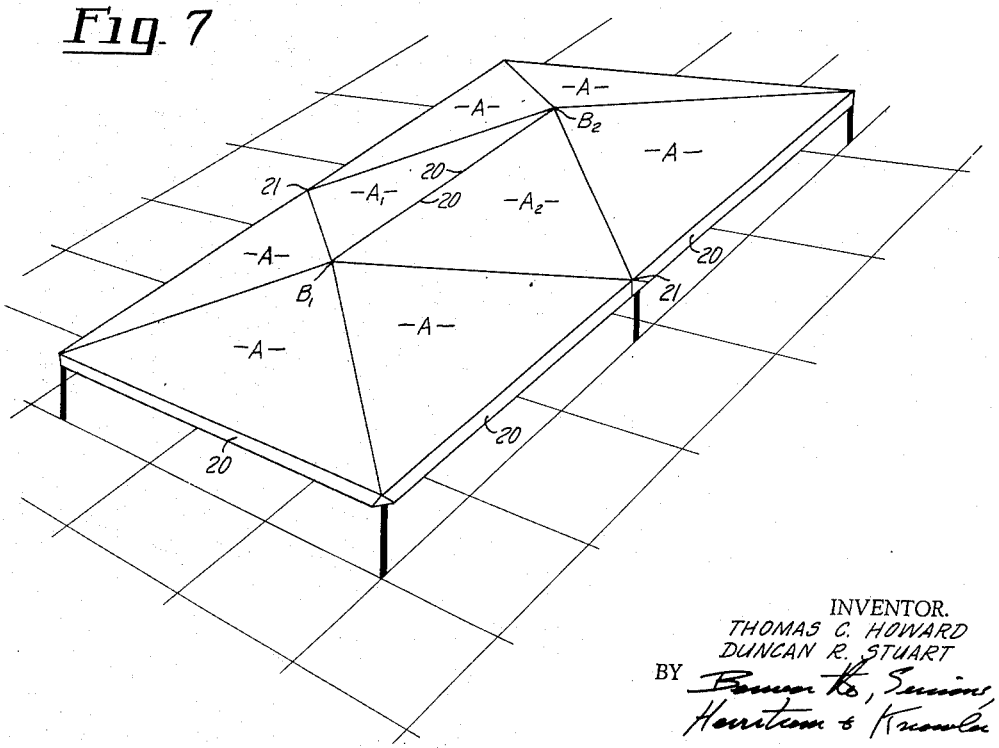
FIGURE 7 is a perspective view of a modified form of rectangular pyramidal structure.

Yet another way in which the triangular sections of this invention may be combined to form a roof structure is shown in FIGURE 7. Eight triangular sections are employed to form a roof covering an area equal to the sum of the area covered by two square base pyramidal structures. However, instead of forming a roof with two pyramidal apexes and a valley between as shown in solid lines in FIGURE 6, the apexes in this structure are joined by a longitudinal ridge. This arrangement is simply accomplished by orienting two triangular sections designated $A_1$ and $A_2$ in FIGURE 7 so that two bases of these sections are adjacent and extend between the apexes $B_1$ and $B_2$. The apexes of the triangular sections $A_1$ and $A_2$ lie at the midpoint of each of the long sides of the entire structure. In addition, sections $A_1$ and $A_2$ are inverted with their smaller triangular surface planes above the larger ones and their side surface planes contiguous with the side surface planes of adjacent sections A. None of the desirable properties of the triangular structure of this invention are lost by reorientation to the position of sections $A_1$ and $A_2$ in FIGURE 7. The truss elements 14 extend horizontally and are contained in vertical planes and otherwise remain in a position of maximum beam strength. It is seen, therefore, that the triangular section of this invention is adapted to be inclined with its apex vertically spaced above or below its horizontally extending base side.

A preferred embodiment of the triangular structure of this invention is shown and described in connection with FIGURE 1. Such a structure comprises a complete and useful element for combining into a wide variety of pyramidal roof structures and combinations thereof according to the teachings of this invention as shown in FIGURES 2, 6 and 7. Various modifications may be made within the scope of this invention to the triangular structure of FIGURE 1 to especially adapt it for particular applications. For instance, when the horizontal base side is to be supported only at each end thereof and the length of that side is such that additional beam strength to resist vertical loads between the supports is required, the longer trusses adjacent the base side may be increased in vertical dimension or made deeper than the shorter trusses near the apex of the triangular structure. Indeed, it is within the scope of this invention to graduate the depth of the trusses from deeper to shallower when proceeding from base side to apex and/or to increase the lateral spacing between trusses when proceeding in the same direction.

Another way in which additional beam strength may be provided for the longer trusses is by vertically combining the trusses and adding additional lateral systems of bracing and cross-braces and thus providing a number of layers and supplementary surface planes containing the additional elements in the reinforced portions of the triangular structure.

The depth and amount of vertical truss reinforcement is to be determined only by structural necessity. It will be apparent that such truss reinforcement may extend above and/or below the regular surface planes.

Figure 8:
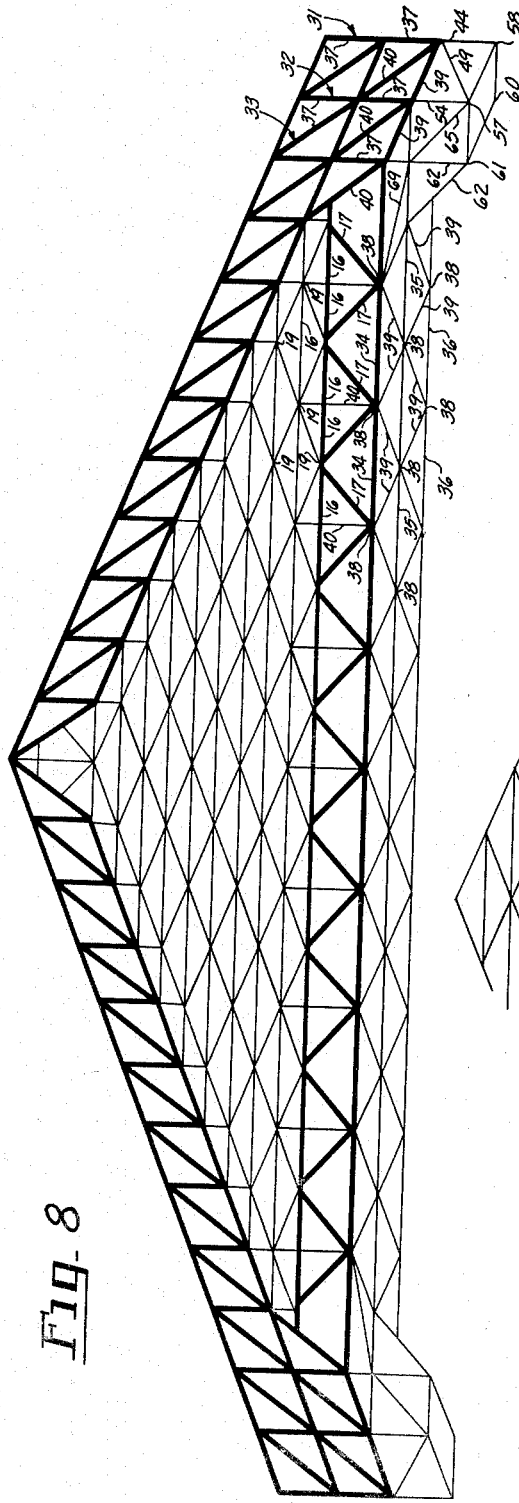
FIGURE 8 is a sectional view similar to FIGURE 4 but of a modified form of triangular structure having a doubled truss base side, and showing in elevation in combination therewith a preferred form of structure for supporting such a pyramidal structure.
Figure 9:
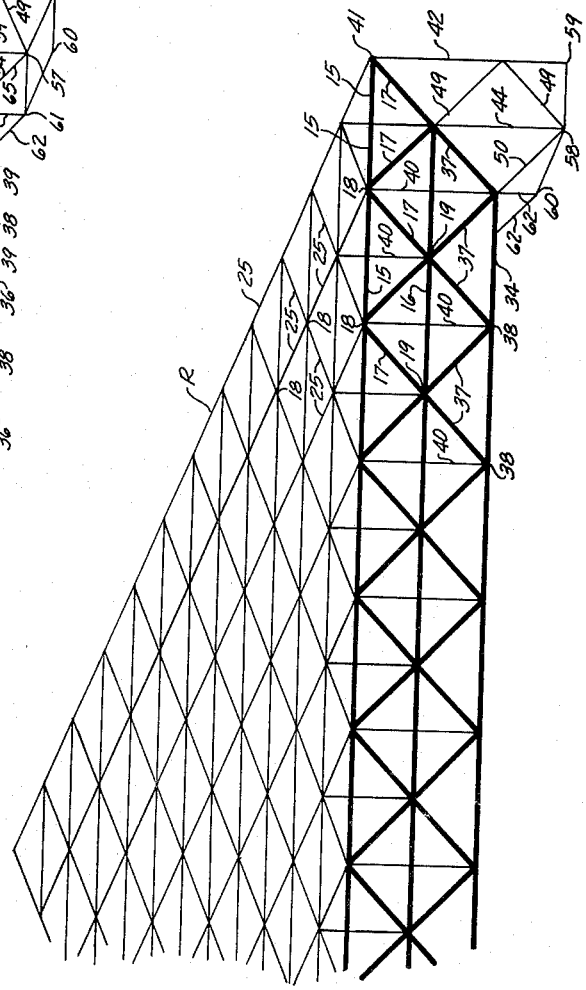
FIGURE 9 is a partial side elevation of the structure shown in FIGURE 8.

A structure modified in this manner is illustrated in FIGURE 8 which is a sectional view like that of FIGURE 4 through the altitude of a modified structure and FIGURE 9 is a partial side elevation view of the same structure shown in FIGURE 8. FIGURES 8 and 9 also show elements for connecting means for supporting the pyramidal structures shown therein and will be described below.

The truss reinforced portion shown is vertically below base truss 31 and adjacent trusses 32 and 33 and comprises chords 34, 35 and 36 lying parallel to and vertically below them in a supplementary plane and web members 37 interconnecting the lower panel points 19 and panel points 38 in the supplementary plane. A lateral system of bracing comprising bracing elements 39 interconnects the panel points 38 in the supplementary plane and cross-braces 40 extend between panel points 38 and panel points 19 in an extension of the pattern of arrangement of cross-braces 28. The chords 34, 35 and 36 are shorter than lower chords 16 above them and thus the proximate ends of chords 34, 35 and 36 are laterally spaced farther apart than the proximate ends of chords 16 of two such truss reinforced triangular structures meeting at a corner of a pyramidal structure.

Figure 10:
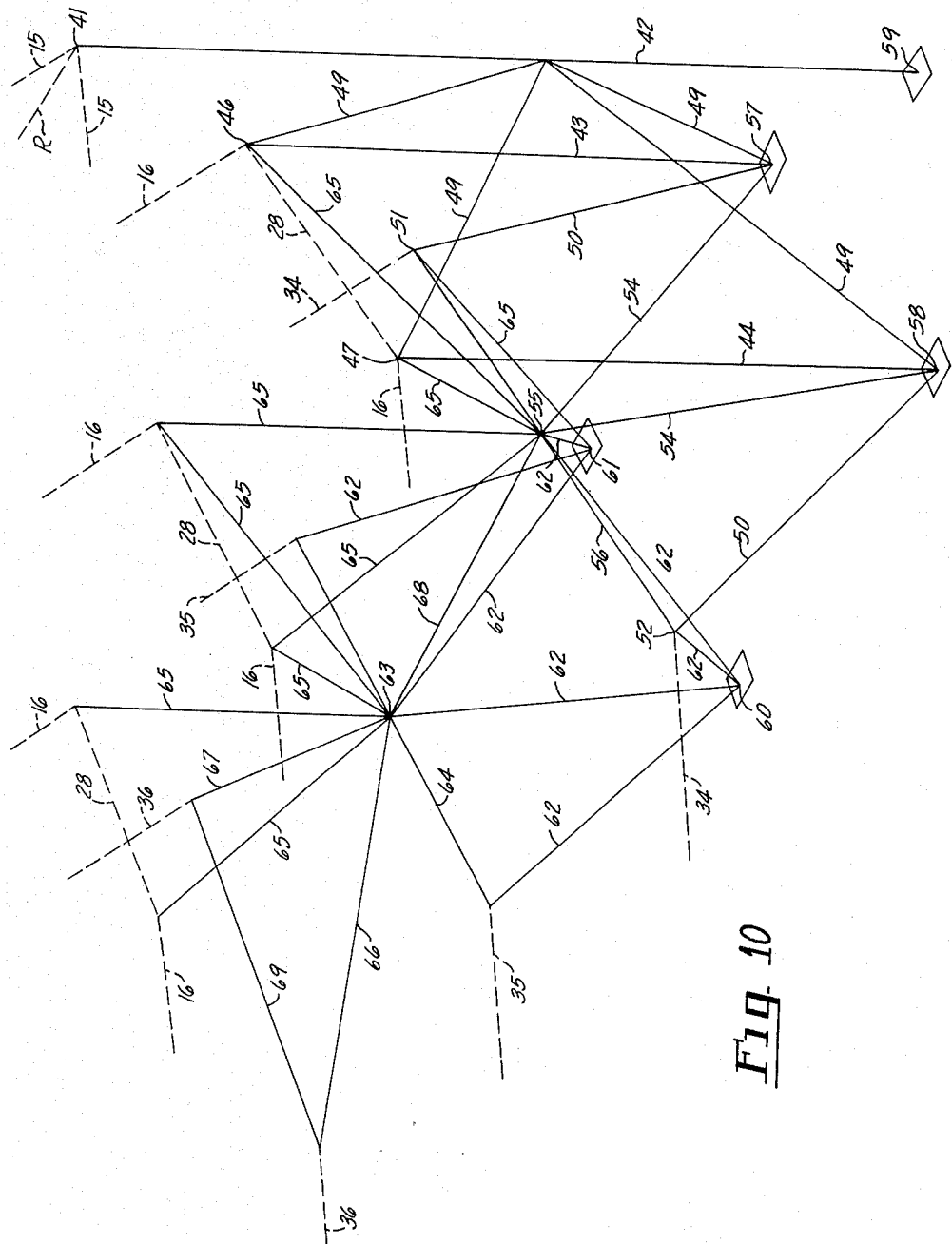
FIGURE 10 is a detailed perspective view on an enlarged scale of the supporting structure shown in elevation in FIGURE 8.

FIGURES 8, 9 and 10 show a preferred form of structure for supporting the corners of the pyramidal roof of the general type shown in FIGURE 2 and comprised of triangular sections each having their base truss and the next two trusses adjacent to it deepened by means of vertical truss reinforcement. Portions of chords and cross-braces 28 of the vertically reinforced trusses 31, 32 and 33 seen in FIGURES 8 and 9 are shown by broken lines in FIGURE 10 where they appear at points of attachment of the supporting structure to the roof structure in order to illustrate more clearly the relationship and interconnection of the two structures. This structure or column connector includes three vertical members 42, 43 and 44. The upper end 41 of vertical member 42 is joined to the corner of the pyramidal structure where the longest and uppermost chords 15 of the base trusses come together along inclined ridge R. The upper ends of vertical members 43 and 44 are joined to the proximate spaced apart ends 46 and 47, respectively, of intermediate chords 16 of the base trusses. The three vertical members 42, 43 and 44 are mutually braced by inclined members 49 interconnecting the vertical members in the manner shown. Additional inclined members 50 extend between and connect the lowermost and farther spaced apart ends 51 and 52 of lower chords 34 of the base trusses and vertical members 43 and 44, respectively. Other inclined members 54 extend between and connect vertical members 43 and 44 and the midpoint 55 of strut 56 which extends between the ends of the lower chords 34.

That part of the column connector described above provides three vertical and laterally spaced apart members providing three points of support 57, 58 and 59 that are mutually braced and assume the load being supported at six points of attachment 41, 46, 47, 51, 52 and 55 in the pyramidal structure and variously located in the three surface planes containing chords lying at the three levels of the corner portion of the pyramidal structure. It will be noted that the three vertical members 42, 43 and 44 each lie in a vertical plane containing a base truss.

Two additional points of support 60 and 61 are provided at a level below the horizontal plane containing lower chords 34, 35 and 36 and vertically beneath the ends of the intermediate chords 16 of the trusses next adjacent the base trusses in the direction of the pyramidal apex. These points of support 60 and 61 are provided by inclined members 62 arranged in two groups of four. One end of each of the four members 62 comprising one group are mutually connected together to form point of support 60 and the four members 62 are connected in like manner to form point of support 61. The other ends of the four members of each group are variously connected to the end of a lower chord 34 in a base truss, a lower chord 35 of a truss next to a base truss and the midpoints 55 and 63 of struts 56 and 64, respectively. Additional bracing is provided by inclined members 65 variously extending between and connecting one of the midpoints 55 or 63 of struts 56 and 64 and the ends of intermediate chords 16. The structure also has three horizontal members 66, 67 and 68. Members 66 and 67 extend from the midpoint 63 of the strut 64 to the ends of strut 69 and the member 68 extends between and connects the midpoint 55 of strut 56 and the midpoint 63 of strut 64.

The complete column connector shown in FIGURE 9 thus provides five laterally spaced apart points of support 57, 58, 59, 60 and 61 to which the load at one corner of the pyramidal structure is transferred through the various members arranged as described above. These members concentrate the load at the five points of support directly from three levels of the base truss and from two levels of the next two trusses adjacent to it. The load concentrated at the five points of support of the column connector may be carried to foundations or structures below them by conventional means.

Changes, modifications and improvements may be made to the above-described preferred and modified forms of the invention without departing from the precepts and principles of the invention. Therefore, this patent should not be limited to any particular form of this invention specifically illustrated and described nor in any manner inconsistent with the extent to which the invention has promoted the art.

We claim:

1. The combination of two self-contained, unitary, load-bearing structures of a generally thickened substantially triangular panel bounded on opposite upper and lower faces by vertically spaced triangular surface planes and having internal strength to carry load as a slab supported at three corner points and also in an inclined position with its base disposed horizontally and its apex at a different elevation, said structure having two sides joining said apex to opposite ends of the base and comprising in its inclined position a plurality of vertically disposed trusses each having straight parallel upper and lower chords and including a truss comprising said base, said trusses extending longitudinally between said sides in vertical planes parallel to said base truss and spaced apart in the direction of the height of the triangle between said base and said apex and of decreasing length from said base truss of greatest length to the shortest truss near said apex, each of said trusses having its upper and lower chords respectively in each of said surface planes and each truss having web members extending between and joining said chords at panel points spaced longitudinally therein, each of the chords of said trusses in one of said surface planes being longer than its vertically corresponding chord in the other of said surface planes, said structures joined with their bases and other trusses vertically disposed and angularly related at an inclined ridge and with their apexes in mutual contact and with two of their sides having a common line of contact in said ridge, and the proximate ends of the longer chords of each of said trusses joined at said ridge, and struts traversing the vertical plane of said ridge and joining the adjacent spaced apart ends of the shorter chords of each of said trusses.

2. A self-contained, unitary, load-bearing structure comprising a generally thickened, substantially triangular panel bounded on opposite upper and lower faces by vertically spaced parallel triangular and similar surface planes, one of which is larger than the other, and having internal strength to carry load as a slab supported at three corner points and also in an inclined position with its base disposed horizontally and its apex disposed at a higher elevation than said base, said structure having two sides joining said apex to opposite ends of the base and comprising in its inclined load-bearing position a plurality of vertically disposed trusses, each having straight parallel upper and lower chords and including a truss comprising said base, said trusses extending longitudinally between said sides in vertical planes parallel to said base truss and spaced apart in the direction of the height of the triangle between said base and said apex and of decreasing length from said base truss of greatest length to the shortest truss near said apex, each of said trusses having its upper and lower chords respectively in each of said surface planes, the larger of said planes containing the longer chords of said trusses and being disposed above the smaller of said planes in which the shorter of said chords lie, and each truss having web members extending between and joining said chords at panel points spaced longitudinally in the trusses, a lateral system of bracing in each surface plane comprising elements interconnecting said panel points of adjacent trusses in said planes respectively, and cross-braces joining panel points of upper and lower chords respectively of adjacent trusses, the sides of said panel comprising said bracing elements which connect panel points at the ends of said trusses.

3. The combination of two structures, each comprising a self-contained, unitary, load-bearing structure comprising a generally thickened substantially triangular panel bounded on opposite upper and lower faces by vertically spaced triangular surface planes and having internal strength to carry load as a slab supported at three corner points and also in an inclined position with its base disposed horizontally and its apex at a different elevation, said structure having two sides joining said apex to opposite ends of the base and comprising in its inclined load-bearing position a plurality of vertically disposed trusses each having straight parallel upper and lower chords and including a truss comprising said base, said trusses extending longitudinally between said sides in vertical planes parallel to said base truss and spaced apart in the direction of the height of the triangle between said base and said apex and of decreasing length from said base truss of greatest length to the shortest truss near said apex, each of said trusses having its upper and lower chords respectively in each of said surface planes and each truss having web members extending between and joining said chords at panel points spaced longitudinally in the trusses, a lateral system of bracing in each surface plane comprising elements interconnecting said panel points of adjacent trusses in said planes respectively, and cross-braces joining panel points of upper and lower chords respectively of adjacent trusses, the sides of said panel comprising said bracing elements which connect panel points at the ends of said trusses, said two structures being joined with their bases and other trusses vertically disposed and angularly related at an inclined ridge and with their apexes in mutual contact and with two of their sides having a common line of contact in said ridge, in which chords of said trusses in a first of said surface planes are longer than chords in a second of said surface planes, and the proximate ends of the longer chords are joined at said ridge, and struts traversing the vertical plane of said ridge and joining the adjacent spaced apart ends of said shorter chords.

4. In the combination of claim 3, columnar means for supporting said combined structure joined thereto at laterally spaced points including the intersection of the longer chords of said base trusses in said ridge and at the ends of shorter chords adjacent said intersection.

5. The combination of two structures, each of which comprises a self-contained, unitary, load-bearing structure comprising a generally thickened substantially triangular panel bounded on opposite upper and lower faces by vertically spaced triangular surface planes and having internal strength to carry load as a slab supported at three corner points and also in an inclined position with its base disposed horizontally and its apex at a different elevation, said structure having two sides joining said apex to opposite ends of the base and comprising in its inclined load-bearing position a plurality of vertically disposed trusses each having straight parallel upper and lower chords and including a truss comprising said base, said trusses extending longitudinally between said sides in vertical planes parallel to said base truss and spaced apart in the direction of the height of the triangle between said base and said apex and of decreasing length from said base truss of greatest length to the shortest truss near said apex, each of said trusses having its upper and lower chords respectively in each of said surface planes and each truss having web members extending between and joining said chords at panel points spaced longitudinally in the trusses, a lateral system of bracing in each surface plane comprising elements interconnecting said panel points of adjacent trusses in said planes respectively, and cross-braces joining panel points of upper and lower chords respectively of adjacent trusses, the sides of said panel comprising said bracing elements which connect panel points at the ends of said trusses, said structures being joined together to form a sloping portion of a roof between a horizontal ridge comprising the base of one structure and a horizontal eave or valley parallel thereto comprising the base of the other structure, all of the general form of a parallelogram, said two structures being arranged with one of the sides of each contiguous with and joined to one of the sides of the other and with the apex of each near one end of the base of the other, and the trusses in each structure being substantially vertically disposed while the apex of one structure is higher than the base of its structure and the apex of the other is lower than the base of its structure.

6. The combination of a plurality of structures, each of which comprises a self-contained, unitary, load-bearing structure comprising a generally thickened substantially triangular panel bounded on opposite upper and lower faces by vertically spaced triangular surface planes and having internal strength to carry load as a slab supported at three corner points and also in an inclined position with its base disposed horizontally and its apex at a different elevation, said structure having two sides joining said apex to opposite ends of the base and comprising in its inclined load-bearing position a plurality of vertically disposed trusses each having straight parallel upper and lower chords and including a truss comprising said base, said trusses extending longitudinally between said sides in vertical planes parallel to said base truss and spaced apart in the direction of the height of the triangle between said base and said apex and of decreasing length from said base truss of greatest length to the shortest truss near said apex, each of said trusses having its upper and lower chords respectively in each of said surface planes and each truss having web members extending between and joining said chords at panel points spaced longitudinally in the trusses, a lateral system of bracing in each surface plane comprising elements interconnecting said panel points of adjacent trusses in said planes respectively, and cross-braces joining panel points of upper and lower chords respectively of adjacent trusses, the sides of said panel comprising said bracing elements which connect panel points at the ends of said trusses, said plurality of structures being arranged to comprise a pyramidal roof having a polygonal base and pyramidal apex and inclined ridges extending from each of the angles of said polygonal base to said pyramidal apex, said polygonal base comprising said bases of said structures joined in end-to-end relationship, said pyramidal apex comprising said apexes of said structures in mutual contact and said inclined ridges lying at the intersections of surface planes of adjacent pairs of said structures, said trusses at corresponding positions between said bases and said apexes of said structures joined in end-to-end relationship to form a series of truss polygons horizontally disposed at different elevations with respect to said polygonal base and of decreasing size from base to apex, the centers of all of said truss polygons being vertically aligned with the apex of said pyramidal roof and each angle of said truss polygons being vertically aligned with one of said inclined ridges.

7. The combination of two structures, each of which comprises a self-contained, unitary, load-bearing structure comprising a generally thickened substantially triangular panel adapted to carry load in an inclined position with its base disposed horizontally and its apex opposite thereto at a different elevation and having elements lying in spaced surface planes, said base comprising a truss lying in a vertical plane, said structure also having two sides joining said apex to opposite ends of the base, said structure comprising a plurality of vertically disposed parallel trusses of decreasing length from base to apex, and each truss having a chord in each of said surface planes and having web members extending between and joining said chords at longitudinally spaced panel points, said trusses extending longitudinally between said sides in vertical planes parallel to said base truss and spaced apart laterally between said base and said apex, a lateral system of bracing comprising elements in each surface plane interconnecting truss panel points in each plane, said system along with the parts of chords between panel points in each surface plane comprising triangles in each surface plane similar to said triangular form, and said structure also comprising cross-braces connecting truss panel points in one surface plane with truss panel points in the other surface plane, said load-bearing structure having increased strength adjacent its base in which at least two adjacent ones of said trusses adjacent the base of the structure are of multiple vertical construction having chords lying beyond one of said surface planes and are interconnected by lateral systems of bracing lying in a supplementary plane spaced from said one surface and in which cross-braces inclined toward said one surface plane join said last-named chords to panel points in said structure, said structures being combined with their bases and other trusses angularly related at an inclined ridge and with their apexes in contact and with two of their sides having a line of contact in said ridge, in which the truss chords in a first surface plane are longer than the truss chords in a second surface plane, and the latter are in turn longer than the chords in said supplementary surface plane, the ends of the longest chords at said ridge being joined and the ends of the intermediate length chords being spaced apart and spaced from the ridge, and the ends of the shortest chords being spaced further apart and further from the ridge, means traversing the vertical plane of the ridge and joining the ends of intermediate and shorter chords, and columnar means supporting said combined structure at the proximate ends of truss chords of all different lengths.

8. A self-contained, unitary, load-bearing structure comprising a generally thickened substantially triangular panel adapted to carry load in an inclined position with its base disposed horizontally and its apex opposite thereto at a different elevation and having elements lying in spaced surface planes, said base comprising a truss lying in a vertical plane, said structure also having two sides joining said apex to opposite ends of the base, said structure comprising a plurality of vertically disposed parallel trusses of decreasing length from base to apex, and each truss having a chord in each of said surface planes and having web members extending between and joining said chords at longitudinally spaced panel points, said trusses extending longitudinally between said sides in vertical planes parallel to said base truss and spaced apart laterally between said base and said apex, a lateral system of bracing comprising elements in each surface plane interconnecting truss panel points in each plane, said system along with the parts of chords between panel points in each surface plane comprising triangles in each surface plane similar to said triangular form, and said structure also comprising cross-braces connecting truss panel points in one surface plane with truss panel points in the other surface plane, said elements being lineal, rigid and interconnected to each other and of relatively much shorter length than the greater linear dimensions of said structure and having structural strength in both tension and compression.

9. A self-contained, unitary, load-bearing structure comprising a generally thickened substantially triangular panel adapted to carry load in an inclined position with its base disposed horizontally and its apex opposite thereto at a different elevation and having elements lying in spaced surface planes, said base comprising a truss lying in a vertical plane, said structure also having two sides joining said apex to opposite ends of the base, said structure comprising a plurality of vertically disposed parallel trusses of decreasing length from base to apex, and each truss having a chord in each of said surface planes and having web members extending between and joining said chords at longitudinally spaced panel points, said trusses extending longitudinally between said sides in vertical planes parallel to said base truss and spaced apart laterally between said base and said apex, a lateral system of bracing comprising elements in each surface plane interconnecting truss panel points in each plane, said system along with the parts of chords between panel points in each surface plane comprising triangles in each surface plane similar to said triangular form, and said structure also comprising cross-braces connecting truss panel points in one surface plane with truss panel points in the other surface plane, said chords of said trusses being of unequal length and said surface planes being triangular with one larger than and similar to the other; the chords of said trusses of greater length lying in the larger of said surface planes and the chords of said trusses of lesser length lying in the smaller of said surface planes, each of said sides of said structure describing a plane inclined to the larger of said surface planes at an acute angle and containing all the members other than chord members which extend between and interconnect ends of said chords of said trusses, said members comprising end web members of trusses, cross-braces which join the ends of the long chords of the shorter trusses and short chords of laterally adjacent longer trusses, and elements of said lateral system of bracing which join the ends of chords of laterally adjacent trusses in each of said surface planes.

10. A combination of two structures, each of which comprises a self-contained, unitary, load-bearing structure comprising a generally thickened substantially triangular panel adapted to carry load in an inclined position with its base disposed horizontally and its apex opposite thereto at a different elevation and having elements lying in spaced surface planes, said base comprising a truss lying in a vertical plane, said structure also having two sides joining said apex to opposite ends of the base, said structure comprising a plurality of vertically disposed parallel trusses of decreasing length from base to apex, and each truss having a chord in each of said surface planes and having web members extending between and joining said chords at longitudinally spaced panel points, said trusses extending longitudinally between said sides in vertical planes parallel to said base truss and spaced apart laterally between said base and said apex, a lateral system of bracing comprising elements in each surface plane interconnecting truss panel points in each plane, said system along with the parts of chords between panel points in each surface plane comprising triangles in each surface plane similar to said triangular form, and said structure also comprising cross-braces connecting truss panel points in one surface plane with truss panel points in the other surface plane, said two structures being joined with their bases and other trusses vertically disposed and angularly related at an inclined ridge and with their apexes in mutual contact and with two of their sides having a common line of contact in said ridge, in which chords of said trusses in a first of said surface planes are longer than chords in a second of said surface planes, and the proximate ends of the longer chords are joined at said ridge, and struts traversing the vertical plane of said ridge and joining the adjacent spaced apart ends of said shorter chords.

11. In the combination of claim 10, columnar means for supporting said combined structure joined thereto at laterally spaced points including the intersection of the longer chords of said base trusses in said ridge and at the points of connection between the ends of the shorter chords and the ends of said struts adjacent said intersection.

References Cited in the file of this patent
UNITED STATES PATENTS

| | | |
|---|---|---|
| 2,201,504 | Ruppel | May 21, 1940 |
| 2,709,975 | Parker | June 7, 1955 |
| 2,986,241 | Fuller | May 30, 1961 |

FOREIGN PATENTS

| | | |
|---|---|---|
| 140,073 | Great Britain | May 20, 1920 |
| 149,600 | Australia | Jan. 7, 1955 |
| 307,977 | Italy | May 19, 1933 |
| 872,303 | France | Feb. 9, 1942 |